March 10, 1942.  H. BANY  2,275,883
GROUND DETECTOR
Filed Nov. 1, 1939
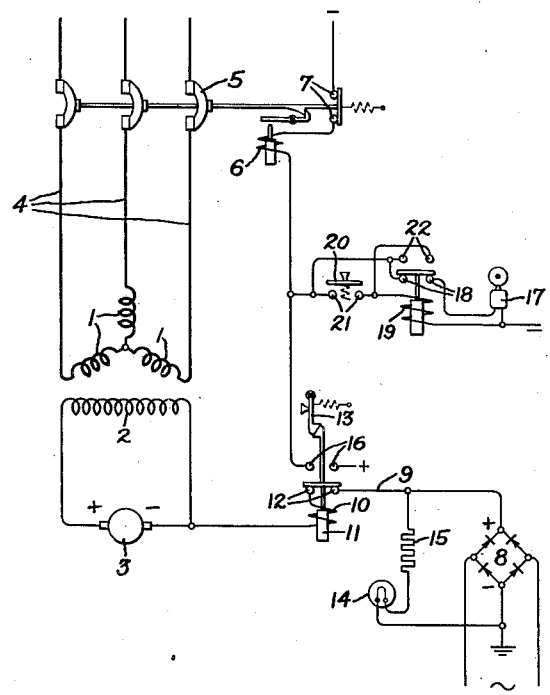
Inventor:
Herman Bany,
by Harry E. Dunham
His Attorney.

Patented Mar. 10, 1942

2,275,883

UNITED STATES PATENT OFFICE 2,275,883

GROUND DETECTOR

Herman Bany, Lansdowne, Pa., assignor to General Electric Company, a corporation of New York Application November 1, 1939, Serial No. 302,387

8 Claims. (Cl. 177—311)

My invention relates to improvements in ground detectors for electrical apparatus and more particularly for dynamo-electric machines which have an exciting winding energized by unidirectional current.

It is necessary quickly to determine the existence of a ground on the exciting winding of a dynamo-electric machine. If this is not done, then another ground occurring before the first is removed produces a turn short circuit, the severity of which is dependent on the number of turns involved. Such a condition is dangerous since it unbalances the flux in the air gap and produces vibrations. These may destroy bearings, deform the rotor shaft, shake the machine loose from its foundation, cause the rotor to rub the stator, etc.

In order to detect a ground, it has been proposed to superimpose on a machine winding a grounded source of alternating electromotive force which would produce a current flow on the occurrence of a ground on the winding. This current flow would effect the operation of a suitable electro-responsive indicating device, such as a relay. In this arrangement there was no provision for effecting the deenergization of the relay when it operated. Also the arrangement was objectionable since, if the relay were made sufficiently sensitive to operate in series with a complete winding circuit, the amount of inductance of this circuit might be so high that the same setting of the relay would cause false operation due to the capacitance of the machine field winding to ground. Moreover, with this arrangement, it is necessary to fit each relay device to the machine in question.

In accordance with my invention, I provide a ground detector arrangement in which a direct electromotive force is superimposed on the apparatus in question whereby to eliminate the necessity for taking into account the reactance and capacity of the machine winding and also to make it possible to use a single standardized arrangement for practically any size of machine. Also in accordance with my invention, I provide an arrangement wherein the electro-responsive device, which responds to the flow of the D.-C. currents on the occurrence of a ground, is quickly deenergized and the flow of the unidirectional fault detecting current stopped in order to avoid heating and danger to any of the apparatus involved. These and other objects of my invention will appear in more detail hereinafter.

My invention will be better understood from the following description when considered in connection with the single figure of the accompanying sheet of drawings, and its scope will be pointed out in the appended claims.

In the single figure of the accompanying drawing a polyphase dynamo-electric machine, such as a synchronous motor or generator, is represented by A.-C. windings 1, which may be rotor windings, and a D.-C. winding 2, which may be a field winding and which is shown as being energized by an exciter 3. The A.-C. windings 1 are shown as connected to the conductors 4 of a polyphase circuit which may be controlled by suitable circuit interrupting means indicated as a latched closed circuit breaker 5. This may be provided with a trip coil 6 and an 'a' auxiliary switch whose contacts 7 are shown in series with the trip coil so as to open the circuit thereof when the circuit breaker opens.

In accordance with my invention, I superimpose on the circuit of the winding 2 a unidirectional electromotive force or a source of direct current one pole of which is connected to ground. Since it is generally undesirable to ground the station battery because of the danger of the possibility of false operation of protective relays and other devices associated therewith, the source of D.-C. which I use is preferably independent of the station battery. Thus, for example, I may use a full-wave rectifier 8 which may be connected on its alternating current side to a suitable alternating current source, such as a station potential transformer, not shown. As shown, the positive pole of the rectifier 8 is connected to the opposite, or negative, pole of the winding 2 through a connection 9 which includes in series therewith the energizing winding 10 of a suitable electroresponsive device, such as a relay 11.

Further, in accordance with my invention, the relay 11 is provided with circuit-opening contacts 12 which are arranged in series in the circuit of the connection 9 and the winding 10 so as to effect the deenergization of the relay 11 upon operation thereof.

In accordance with my invention, the relay 11 is preferably of the nonself-resetting type so that, upon operation of the relay, the superimposed current detecting circuit can remain deenergized until such time as it is desired to close it. For this purpose the relay 11 may be provided with a latch 13 which is engaged, upon energization of the relay, to maintain it in the energized position after deenergization of its winding 10. The latch 13 may be manually released to reset the relay or, as is well known to the art, electrical resetting means may be used.

In order to supervise the D.-C. source 8, there may be connected across the D.-C. terminals of the rectifier an indicating means, such as a lamp 14, in circuit with which there may be included current limiting means, such as a resistance 15.

Also, in accordance with my invention, the relay 11 is preferably provided with circuit-closing contacts 16 which, upon energization of the relay, complete a circuit of suitable alarm or indicating means shown as a bell 17. For the purpose of controlling this alarm so that it may be stopped at will and not continued indefinitely until it is possible to restore the relay 11 to its normally deenergized position, the circuit of the bell 17 may be made by way of the circuit- opening contacts 18 of an auxiliary relay 19, as shown. This relay may be energized by operating a switch 20 to close contacts 21 in the circuit of the relay 19 through the circuit-closing contacts 16 of the relay 11. Upon energization of the relay 19, it seals itself in around the switch 20 through its circuit-closing contacts 22 thus maintaining the bell 17 deenergized until such time as the relay 11 is restored to its normal ground detecting position. If desired, the circuit of the trip coil 6 may be arranged to be energized by the closure of the contacts 16, as shown. As will be obvious to those skilled in the art, the relay 11 could be arranged to control the opening of a circuit breaker in the circuit of the field winding 2.

Since the supervisory current is D. C., the effect of the reactance and capacitance of the winding 2 relatively to the setting of the relay 11 is immaterial and consequently the supervisory current can be small in comparison with the exciter current and a given standardized arrangement used on practically any machine. Although I have shown my invention in connection with a dynamo-electric machine, its application is not limited thereto since the unidirectional supervisory current can be superimposed upon any circuit for detection of grounds thereon to accomplish the advantages which result in the use of my invention.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a ground detector for a dynamo-electric machine having an exciting winding energized by a unidirectional current, a source of direct current having one pole grounded, a connection from the other pole of said source to said winding at a point thereof of opposite polarity, and means operative in response to a predetermined flow of current in the circuit including said connection upon the occurrence of a ground on said winding.

2. In a ground detector for a dynamo-electric machine having an exciting winding energized by a unidirectional current, a source of direct current having one pole grounded, a connection from the other pole of said source to said winding at a point thereof of opposite polarity, and means including a device having an energizing winding connected in series relation in a circuit including said connection operative in response to a predetermined flow of current in said circuit upon the occurrence of a ground on said winding to effect an interruption of said circuit and an indication of said ground.

3. In a ground detector for a dynamo-electric machine having an exciting winding energized by a unidirectional current, a source of direct current having one pole grounded, a connection from the other pole of said source to said winding at a point thereof of opposite polarity, and means including a relay having an energizing winding and circuit opening contacts connected in series relation in a circuit including said connection operative in response to a predetermined flow of current in said circuit upon the occurrence of a ground on said winding to effect an indication of said ground.

4. In a ground detector for a dynamo-electric machine having an exciting winding energized by a unidirectional current, a source of direct current having one pole grounded, a connection from the other pole of said source to said winding at a point thereof of opposite polarity, means including a nonself-resetting relay having an energizing winding, circuit-closing contacts and circuit-opening contacts, said winding and said circuit-opening contacts being connected in series relation in a circuit including said connection whereby upon energization of said relay to interrupt said circuit, and an indicating circuit including the circuit-closing contacts of said relay and an indicating device.

5. In a ground detector for a dynamo-electric machine having an exciting winding energized by a unidirectional current, a source of direct current having one pole grounded, a connection from the other pole of said source to said winding at a point thereof of opposite polarity, means including a nonself-resetting relay having an energizing winding, circuit-closing contacts and circuit-opening contacts, said winding and said circuit-opening contacts being connected in series relation in a circuit including said connection whereby upon energization of said relay to interrupt said circuit, an indicating circuit including the circuit-closing contacts of said relay and an indicating device, and means operative to eliminate the indicating action of said indicating device until said relay is reset.

6. In combination a dynamo-electric machine having an exciting winding energized by unidirectional current, circuit interrupting means in circuit with said machine, a source of direct current having one pole grounded, a connection from the other pole of said source to said winding at a point thereof of opposite polarity, and means for controlling the operation of said circuit interrupting means including a device having an energizing winding connected in series relation in a control circuit including said connection operative in response to a predetermined flow of current in said circuit upon the occurrence of a ground on said winding to effect an interruption of said control circuit and a circuit-opening operation of said circuit interrupting means.

7. In combination, an alternating current machine having an exciting winding, a dynamo-electric machine for energizing said exciting winding with a unidirectional current, a source of alternating current, a rectifier connected to be energized from said source of alternating current and having one pole grounded, a connection from the other pole of said rectifier to said winding at a point thereof of opposite polarity, and means including a device having an energizing winding connected in series relation in said connection operative in response to a predetermined flow of current in the connection upon the occurrence of a ground on the circuit of said exciting winding to effect an indication of said ground.

8. In combination, an alternating current machine having an exciting winding, a dynamo-electric machine for energizing said exciting winding with a unidirectional current, a rectifier connected to be energized from the alternating current side of said alternating current machine and having one pole grounded, a connection from the other pole of said rectifier to said winding at a point thereof of opposite polarity, and switching means having an energizing winding connected in series relation in said connection operative in response to a predetermined current flow in the connection upon the occurrence of a ground on the circuit of said exciting winding to effect an indication of said ground and to interrupt said connection.

HERMAN BANY.